E. GATHMANN.

PERCUSSION FUSE.

APPLICATION FILED FEB. 2, 1906.

Reissued July 9, 1912.

13,439.

Witnesses
J. G. Stinkel
B. C. Rust

Inventor
Emil Gathmann
by Inter, Beeman & Watson
Attorneys

UNITED STATES PATENT OFFICE.

EMIL GATHMANN, OF SOUTH BETHLEHEM, PENNSYLVANIA, ASSIGNOR TO BETHLEHEM STEEL COMPANY, OF SOUTH BETHLEHEM, PENNSYLVANIA, A CORPORATION OF PENNSYLVANIA.

PERCUSSION-FUSE.

13,439. Specification of Reissued Letters Patent. Reissued July 9, 1912.

Original No. 735,238, dated August 4, 1903, Serial No. 158,700. Application for reissue filed February 2, 1906. Serial No. 299,220.

*To all whom it may concern:*

Be it known that I, EMIL GATHMANN, a citizen of the United States, residing at South Bethlehem, in the county of Northampton and State of Pennsylvania, have invented certain new and useful Improvements in Percussion-Fuses, of which the following is a specification.

This invention relates to improvements in percussion-fuses, and has for its object the prevention of premature or accidental explosion of the shell to which the fuse is fitted.

The percussion or prime caps or pellets of fuses are necessarily quite sensitive to sudden shocks or blows, being usually composed of or containing some detonating mixtures, such as fulminate, and accidental explosions may and sometimes do take place. I have devised means whereby if an explosion occurs it will be isolated or confined to the primer-cap without igniting the magazine or shell charge, and said means consists of an automatic valve or shutter which normally separates the cap from the exploding or shell charge.

Figure 1:
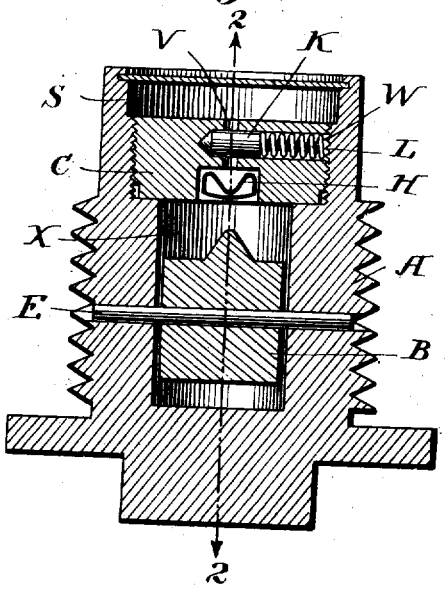
Figure 2:
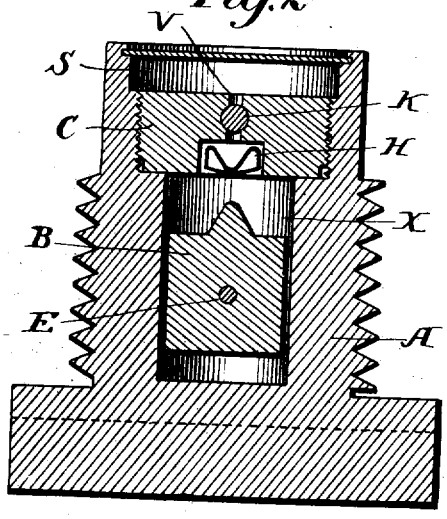

In the accompanying drawings, Figure 1 is a longitudinal section of a fuse-plug embodying my improvements; Fig. 2 is a section on the line 2—2, Fig. 1.

The stock or body A of the plug has any usual form of exploder or hammer B, held in normal position in a chamber X by a brittle shear or safety wire E. Forward of the hammer is the anvil C, in which is a seat for the percussion-cap H, containing the initial igniting charge. The anvil C is stationary, or relatively fixed, in the stock A and separates the hammer chamber X from the magazine S and the shell charge. A channel or vent V leads from the cap-seat to the magazine S or to the charge of the shell. Interposed in the path of the channel is a valve K, which, as shown, is held in normal closing position by a small spiral spring L. This valve K is located in a radial bore or opening so as to be eccentric to the axis of rotation when the fuse is inserted in a projectile which is to be fired from a rifled gun. During the usual handling of the projectile the safety-wire normally keeps the hammer B from contact with the cap H, and if the wire should be broken through by any chance and the cap be exploded by violent contact with the hammer the interposition of the valve keeps the flame from passing through the vent to the powder charge. In firing the shell from the gun the setback or inertia of all parts tends to resist any forward motion and the wire E will be sheared, and as long as the motion of the shell is accelerated the valve K will press firmly to rear of its seat, inasmuch as the force of acceleration is much greater than the centrifugal force, which (as the rifling in guns is usually of an increased pitch toward the muzzle of the gun) will only acquire its maximum pull at or near the point where the projectile leaves the bore of the gun. At this latter point acceleration practically ceases and the stronger pull will be that due to the rotary motion of the projectile generating centrifugal force, the predetermined time of action depending on the force of the spring L which is so adjusted that it will act to close the valve with about one-half of the pull caused by centrifugal force, so that the valve K will, under centrifugal action, quickly open the vent V, sliding in the lateral bore W toward the outer part, where it will remain during the flight of the shell, as the rotary motion of the shell is practically constant during the entire period of travel at even the greatest ranges. Upon impact with the target the hammer will fire the cap H, and flame from the same, passing through the now-unobstructed vent, will in turn ignite the charge of the shell or the intermediate magazine charge. As shown the excess of metal at the end of the valve K abutting against the spring L constitutes the means whereby the valve is shifted on rotation of the projectile, but it will be understood that other means may be employed for this purpose.

Without limiting myself to the construction shown, I claim:—

1. In a percussion fuse, the combination with the fuse stock, of a fixed anvil therein, a seat for a primer on one side of said anvil, a channel leading from said seat to the shell-charge, a valve closing said channel, and means whereby the said valve is shifted on the rotation of the projectile, substantially as set forth.

2. In a percussion fuse, the combination with the fuse stock, of a fixed anvil therein, a seat for a primer on one side of said anvil, a chamber for an igniting charge, a channel leading from said seat to the said chamber, a valve closing said channel, and means whereby the said valve is shifted on the rotation of the projectile, substantially as set forth.

3. In a percussion fuse, the combination with the fuse stock, of a fixed anvil therein, a seat for a primer on one side of said anvil, means for exploding the primer when the projectile strikes an object, a channel leading from the primer-seat to the shell-charge, a valve closing said channel, and means whereby the said valve is shifted on the rotation of the projectile, substantially as set forth.

4. In a percussion fuse, the combination with the fuse stock, of a fixed anvil therein, a seat for a primer on one side of said anvil, exploding means, a channel extending forward from said seat to the exploding means, and a valve closing said channel and arranged to be shifted by centrifugal action, substantially as set forth.

5. The combination in a percussion fuse, and with a fixed anvil, a primer seat therein, and exploding means, of a channel extending forward from said seat to the exploding means, a valve closing said channel and arranged to be shifted by centrifugal action, and a spring normally holding the valve to its seat, substantially as set forth.

6. In a percussion fuse, the combination with the fuse stock, of a relatively fixed anvil therein, a seat for a primer on one side of said anvil, exploding means, a channel extending forward from said seat to the exploding means, and a valve closing said channel and arranged to slide by centrifugal action in a radial opening, substantially as set forth.

7. In a percussion fuse, the combination with the fuse stock, of a relatively fixed anvil therein, a seat for a primer on one side of said anvil, a firing hammer, means for holding it normally out of action, a channel extending forward from the said seat to the shell charge, a valve interposed in said channel, said valve being arranged to be shifted by the rotation of the projectile, substantially as set forth.

In testimony whereof I have signed my name to this specification in the presence of two subscribing witnesses.

EMIL GATHMANN.

Witnesses:

WILLIAM E. HORNE,

WILLIAM F. HARTMANN.

Copies of this patent may be obtained for five cents each, by addressing the "Commissioner of Patents, Washington, D. C."